United States Patent
Breytman et al.

(10) Patent No.: US 6,918,538 B2
(45) Date of Patent: Jul. 19, 2005

(54) IMAGE SCANNING DEVICE HAVING A SYSTEM FOR DETERMINING DISTANCE TO A TARGET

(75) Inventors: Alex Breytman, Bellmore, NY (US); Mark Krichever, Hauppauge, NY (US); Brad Carlson, Huntington, NY (US); Tsi David Shi, Stony Brook, NY (US); Dmitriy Yavid, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 94 days.

(21) Appl. No.: 10/425,499

(22) Filed: Apr. 29, 2003

(65) Prior Publication Data

US 2004/0118919 A1 Jun. 24, 2004

Related U.S. Application Data

(60) Provisional application No. 60/434,519, filed on Dec. 18, 2002.

(51) Int. Cl.$^7$ ................................................. G06K 7/10
(52) U.S. Cl. ................................... 235/454; 235/462.23
(58) Field of Search ........................... 235/454, 462.23, 235/462.24, 462.2, 462.45, 472.01

(56) References Cited

U.S. PATENT DOCUMENTS

| | | | |
|---|---|---|---|
| 3,812,459 A | 5/1974 | MacNeill et al. | ............ 235/470 |
| 4,251,798 A | 2/1981 | Swartz et al. | ............ 235/462.2 |
| 4,877,949 A | * 10/1989 | Danielson et al. | ..... 235/462.21 |

(Continued)

FOREIGN PATENT DOCUMENTS

| | | | | |
|---|---|---|---|---|
| JP | 63083886 A | * | 4/1988 | .......... G06K/7/015 |
| WO | 01/29636 | | 4/2001 | |

OTHER PUBLICATIONS

Patrick Loschmidt, "Lasermesstachnik Und Signalverarbeitung Aus Physik", 1995, pp. 1–58, Austria, http://pluslucis.uniivie.ac.at/FBA/FBA95/Loschmidt/.

Kitagawa Y et al., "Fiber–Optic Sensor Distance And Velocity Measurements Using Speckle Dynamics", Applied Optics, Optical Society of America, Washington, vol. 24, No. 7, Apr. 1, 1985, pp. 955–959.

*Primary Examiner*—Thien M. Le
*Assistant Examiner*—Uyen-Chau N. Le
(74) *Attorney, Agent, or Firm*—Carter, DeLuca, Farrell & Schmidt, LLP (57) ABSTRACT

An image scanning device is provided which includes a system for determining the distance to a target to be scanned. The image scanning device includes an optical system and an image sensor array for focusing a light beam and imaging the target. The device preferably includes an automatic focusing system for adjusting the position of the optical system in order to adjust the focal point, and thereby focus the image of the target onto the image sensor array. In one embodiment of the image scanning device, the distance is determined by analyzing a collimated aiming pattern formed by collimating the light beam. In another embodiment, the distance is determined by analyzing a speckle pattern caused by the speckle effect upon the light beam hitting the target.

23 Claims, 5 Drawing Sheets

U.S. PATENT DOCUMENTS

| | | | | |
|---|---|---|---|---|
| 4,974,920 A | * | 12/1990 | Chovan et al. | 359/1 |
| 5,192,856 A | | 3/1993 | Schaham | 235/462.24 |
| 5,308,966 A | | 5/1994 | Danielson et al. | 235/462.23 |
| 5,414,251 A | | 5/1995 | Durbin | 235/462.2 |
| 5,561,283 A | | 10/1996 | Dvorkis et al. | 235/462.09 |
| 5,576,529 A | | 11/1996 | Koenck et al. | 235/462.47 |
| 5,635,697 A | | 6/1997 | Shellhammer et al. | 235/462.11 |
| 5,640,001 A | | 6/1997 | Danielson et al. | 235/462.23 |
| 5,699,149 A | * | 12/1997 | Kuroda et al. | 356/4.01 |
| 5,703,349 A | | 12/1997 | Meyerson et al. | 235/462.48 |
| 5,710,417 A | | 1/1998 | Joseph et al. | 235/462.11 |
| 5,796,089 A | | 8/1998 | Marom | 235/462.09 |
| 5,798,515 A | | 8/1998 | Li et al. | 235/472.01 |
| 5,821,522 A | | 10/1998 | Li et al. | 235/472.01 |
| 5,837,987 A | * | 11/1998 | Koenck et al. | 235/462.27 |
| 5,920,060 A | | 7/1999 | Marom | 235/462.2 |
| 5,969,321 A | * | 10/1999 | Danielson et al. | 235/462.01 |
| 6,123,264 A | | 9/2000 | Li et al. | 235/472.01 |
| 6,138,915 A | * | 10/2000 | Danielson et al. | 235/472.02 |
| 6,336,587 B1 | | 1/2002 | He et al. | 235/462.45 |
| 6,340,114 B1 | | 1/2002 | Correa et al. | 235/462.22 |
| 6,548,795 B1 | * | 4/2003 | Atkinson et al. | 250/201.2 |
| 6,717,124 B2 | * | 4/2004 | Atkinson et al. | 250/201.2 |

* cited by examiner

IMAGE SCANNING DEVICE HAVING A SYSTEM FOR DETERMINING DISTANCE TO A TARGET

PRIORITY

This application claims priority from a U.S. Provisional Application filed on Dec. 18, 2002 and assigned U.S. Provisional Application Ser. No. 60/434,519, the contents of which are incorporated herein by reference.

BACKGROUND OF THE INVENTION

1. Field of the Invention

This invention relates to imaging in optical code reading devices. This invention is particularly useful in solid state, area image sensor based, handheld code readers which are positioned at variable orientations and distances with respect to a target code and where a sharply focused image of the code is desirable for reliable code capture and decoding.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another by bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like.

One embodiment of such a scanning system resides, in a hand-held, portable laser scanning head supported by a user, which is configured to allow the user to aim the head, and more particularly, a light beam, at a target and a symbol to be read.

The light source in a laser scanner bar code reader is typically a gas laser or semiconductor laser. The use of semiconductor devices as the light source in scanning systems is especially desirable because of their small size, low cost and low voltage requirements. The laser beam is optically modified, typically by a focusing optical assembly, to form a beam spot of a certain size at the target distance. It is preferred that the cross section of the beam spot at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per a given area represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies, a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In the laser beam scanning systems known in the art, the laser light beam is directed by a lens or similar optical components along a light path toward a target that includes a bar code or other symbol on the surface. The moving-beam scanner operates by repetitively scanning the light beam in a line or series of lines across the symbol by means of motion of a scanning component, such as the light source itself or a mirror, disposed in the path of the light beam. The scanning component may either sweep the beam spot across the symbol and trace a scan line or pattern across the symbol, or scan the field of view of the scanner, or do both.

Bar code reading systems also include a sensor or photodetector which functions to detect light reflected or scattered from the symbol. The photodetector or sensor is positioned in the scanner in an optical path so that it has a field of view which ensures the capture of a portion of the light which is reflected or scattered off the symbol and is detected and converted into an electrical signal. Electronic circuitry or software decodes the electrical signal into a digital representation of the data represented by the symbol that has been scanned. For example, the analog electrical signal detected by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the alphanumeric characters so represented.

Moving-beam laser scanners are not the only type of optical instrument capable of reading bar code symbols. Another type of bar code reader particularly relevant to the present invention is one which incorporates detectors based upon charge coupled device (CCD) technology. In such prior art readers the size of the detector is typically smaller than the symbol to be read because of the image reduction by the objective lens in front of the CCD. The entire symbol is flooded with light from a light source such as light emitting diodes (LED) in the reader, and each CCD cell is sequentially read out to determine the presence of a bar or a space.

Inclusion of an auto focus system incorporating a method for determining distance to a targeted indicia and moveable or variable-focus optics in a CCD or other image based scanning device is envisioned as a method for extending the versatility and working range of the system.

It is a general object of the present invention to provide an improved optical code reader without the limitations of prior art readers.

It is another object of the present invention to provide a means for controlling an automatic focusing optics assembly in an optical code reader according to a determined distance to a targeted indicia.

It is yet another object of the present invention to provide a system for creating and analyzing light patterns for determining the distance to the targeted indicia and subsequently provide focus-adjusting control signals to the optics assembly.

SUMMARY OF THE INVENTION

The present invention relates to methods and apparatus for improving the code acquisition of optical code readers, especially imaging code readers. Techniques are disclosed which are applicable for determining distance to a targeted indicia for controlling an automatic focusing optical assembly of an imaging code reader. The present invention makes use of collimated aiming patterns and speckle patterns to determine distance.

In a first embodiment of an optical code reader, where a collimated aiming pattern is used for determining distance, laser beams are aimed at the targeted indicia. The beams incident to the indicia are subsequently reflected back to the optical code reader and detected by a segment of a detector, i.e. array of photodetectors, CCD, or other imaging element. The reflected beam illuminates different segments of the detector based on the distance to the targeted indicia. By using the known position of the components within the code reader, and basic equations, the distance to the targeted indicia can be determined. The distance determination may be performed either in real-time through the use of a processor to calculate the distance based on the data from the detector, or through the use of a data structure, such as a lookup table, which cross-references detector data with their corresponding distance values.

In another embodiment of an optical code reader, where a speckle pattern is used to determine distance, a laser beam illuminates the targeted indicia producing a speckled pattern, known in the art as the speckle effect, on an image sensor. As the image sensor is moved closer to the targeted indicia, the speckle noise or speckles that make up the speckled pattern become smaller producing a higher spatial distribution frequency on the image sensor, while conversely, as the image sensor is moved further away from the targeted indicia, the speckles increase in size and merge resulting in a lower spatial distribution frequency. The relation between distance to the targeted indicia and speckle spatial distribution frequency can be correlated using a data structure, such as a lookup table, where a plurality of spatial distribution values are cross referenced with their corresponding distance values. Alternatively, a processor calculates the distance of the targeted indicia from the speckle spatial distribution data through the use of an algorithm or application software.

BRIEF DESCRIPTION OF THE DRAWINGS

Various embodiments of the invention will be described herein below with reference to the figures wherein.

DETAILED DESCRIPTION OF THE PREFERRED EMBODIMENTS

In the present invention, an optical code reader having an imaging engine is provided. The optical code reader includes an image sensor. Such an image sensor may be a two-dimensional or area charge coupled device (CCD) and associated circuitry for producing electronic signals corresponding to a two-dimensional array of pixel information for a field of view. The optical code reader of the present invention also includes the capabilities of determining distance to a targeted indicia by utilizing properties of reflected coherent light and adjusting the focus quality of an image impinged on the image sensor according to the determined distance.

Figure 1:
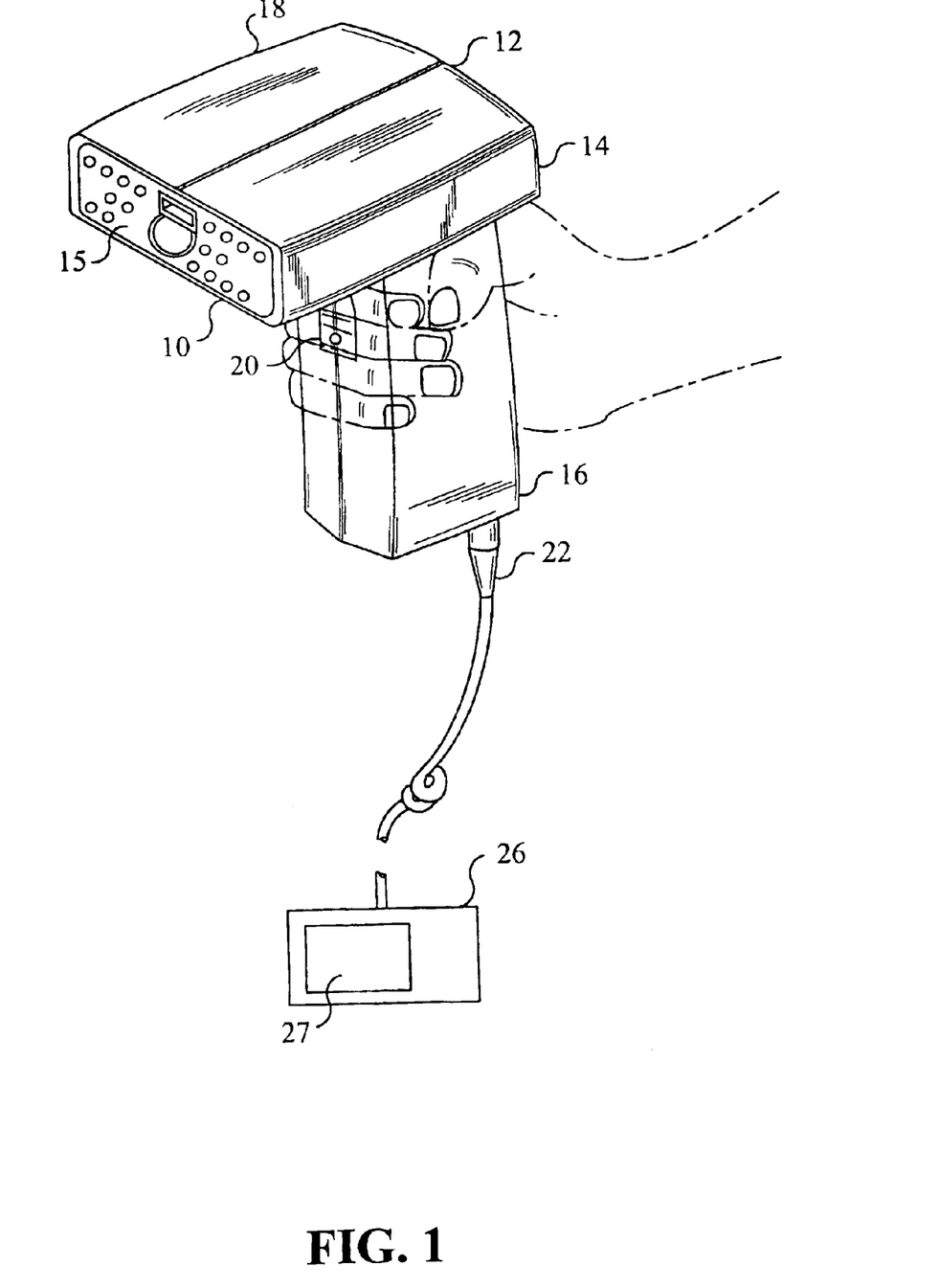
FIG. 1 is a pictorial view of a handheld optical code reader and a schematic view of a host terminal.

FIG. 1 is a pictorial view of a handheld optical code reader 12 and a schematic view of a host terminal 26 which may be used for various imaging functions of the present invention. The handheld code reader 12 includes a housing 14 having a generally elongated handle or hand grip 16 and an upper portion 18 for housing an imaging engine 10. The front face 15 of the imaging engine 10 appears at the forward end of the upper portion 18 of the handheld optical code reader 12. The cross-sectional dimensions and overall size of the handle portion 16 are such that the optical code reader 12 can conveniently be held in the user's hand.

The optical code reader 12 senses incident light reflected off of an object (the object may be a plurality of objects) within a field of view of the optical code reader 12 for obtaining image data. The object may be an optical code, such as a bar code, or a non-code object. An imaging actuation means, such as a manual trigger 20 is mounted in moving relationship on the handle portion 16 in a forward facing region of the optical code reader 12. The user's forefinger is normally used to actuate the optical code reader 12 by depressing the trigger 20 for actuating sensing and imaging of the object.

A flexible electrical cable 22 is provided to connect the optical code reader 12 to the host terminal 26. In alternative embodiments, the cable 22 may also provide electrical power to the reader 12. In a further alternative embodiment, the cable 22 may be partially or fully replaced by wireless communication means such as radio frequency, optical or cellular communication means. In preferred embodiments, the optical code reader 12 includes a means for processing the pixel signals, and the processed information may be transmitted via the cable 22 from the optical code reader 12 to the host terminal 26.

A decode module may be provided in the optical code reader 12 and/or in the host terminal 26 for decoding image data corresponding to an optical code. An image data compression module 27 may be provided for compressing the image data.

The host terminal 26 includes at least one data processor, where the at least one data processor may be connected to one or more peripherals or computing devices, such as a video monitor, and/or a network. Compressed image data may be transmitted to the host terminal 26 over electrical cable 22. The transmission of video data may be triggered by pressing the trigger 20 or by actuating another switch on the optical code reader 12. The image data may then be applied to the host terminal 26. The compressed image data may be applied to a serial communication port of the host terminal 26, such as the serial communication port of a personal computer when such a device is used as the host terminal 26. The image data may be processed by a data processor (not shown) within the personal computer and selectively displayed on monitor (not shown). A color video image may be obtained.

Figure 2:
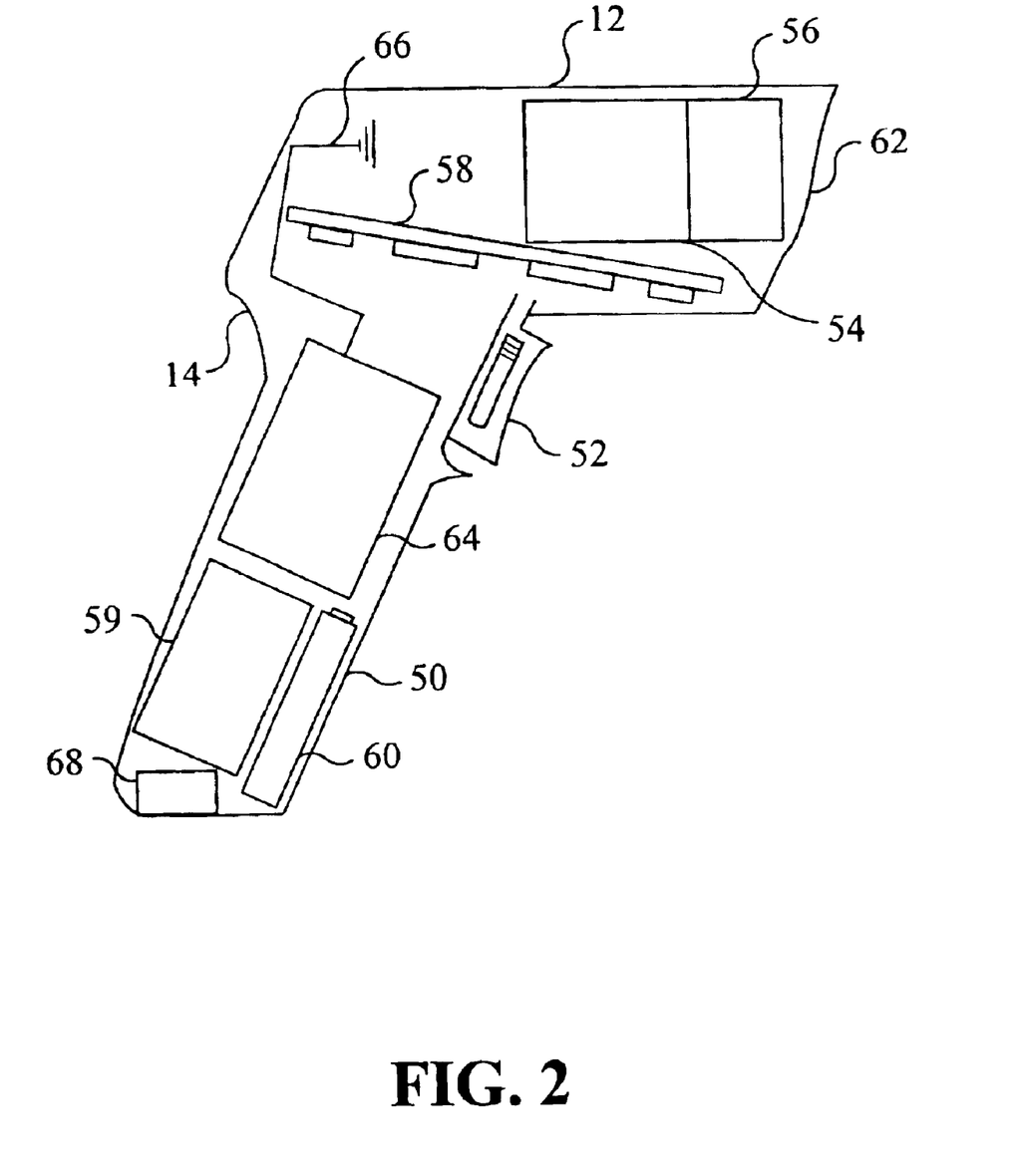
FIG. 2 is a block schematic of the handheld optical code reader of FIG. 1 showing the inner components, including an automatic focusing optics assembly and distance determining (range finding) components in accordance with the present invention.

FIG. 2 is a sectional view of the inner components of the optical code reader 12. The inner components include an auto-focusing optics assembly, distance determining components, imaging unit, and various other support systems which are incorporated into the handheld optical code reader 12. The reader 12 can be connected to a data storage system, i.e. computer-based inventory management database or cash register, via one of a plurality of standard wireless technologies allowing greater, unrestricted mobility within the working range of the particular wireless protocol chosen.

In a wireless embodiment, the power source, preferably rechargeable, will need to be contained in the handheld code reader 12 and a recharging cradle may be provided for recharging the handheld unit. The cradle can be connected to the data storage system for downloading data from the optical code reader 12 and for uploading data to the optical code reader 12.

With reference to FIG. 2, the optical code reader 12 is a handheld, gun shaped, device having an ergonomic, pistol-grip type handle 50. A movable trigger 52 is employed to allow the operator to activate the image acquisition components 54 and distance determining means components 56. The housing 14 contains the light source, automatic focusing system, image sensor, and signal processing circuitry 58, which includes a CPU which implements decoding algorithms and lookup table data retrieval functionality. Memory components 59 are also included for storing the lookup table data correlating light pattern parameters with distance values.

A power source 60 in the form of a battery is provided. A light-transmissive window 62 in the front end of the code reader 12 allows the outgoing light beam to exit the housing 14 and the incoming reflected light to enter while also protecting the delicate optics from dust and scratches. The wireless receiver and transmitter 64 and antenna 66 allow for greater freedom of movement for the operator.

The rechargeable power source 60 provides ample power to allow the code reader 12 to operate for a convenient period of time before needing to recharge on its base through the connector 68 located at the bottom of the grip 50. Typically, this type of code reader 12 is designed to operate within a range of several inches of the optical code or indicia.

It will be understood that aspects of the present invention are also applicable to imaging engines which are not located in conventional handheld scanners or guns. For example, the imaging engine may be incorporated into a computer terminal in a fixed location or in a rotating turret. Such arrangements are particularly well adapted for using the imaging engine and distance determining components as part of a video phone system which also uses the display, processing and I/O capabilities of the computer.

The optical code reader 12 of the present invention may further include frame grabbing circuitry for providing video signals for displaying images produced by the apparatus on a terminal monitor. In this case hardware modification of existing terminals may be avoided.

Alternatively, the imaging engine 10 may be attached to or integrated with a portable, handheld computer device, such as a PDA and handheld computer devices available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below.

In portable applications where electrical power is supplied by batteries, it is particularly important to conserve energy. Power management techniques may include switching the images to lower resolution or frame rates to conserve power. Alternatively, the imaging engine or other optical code reader circuitry, or portions thereof, may be periodically shut down or enter a sleep mode, or shut down when the system senses that the battery charge level has dropped below a pre-selected level.

Figure 3:
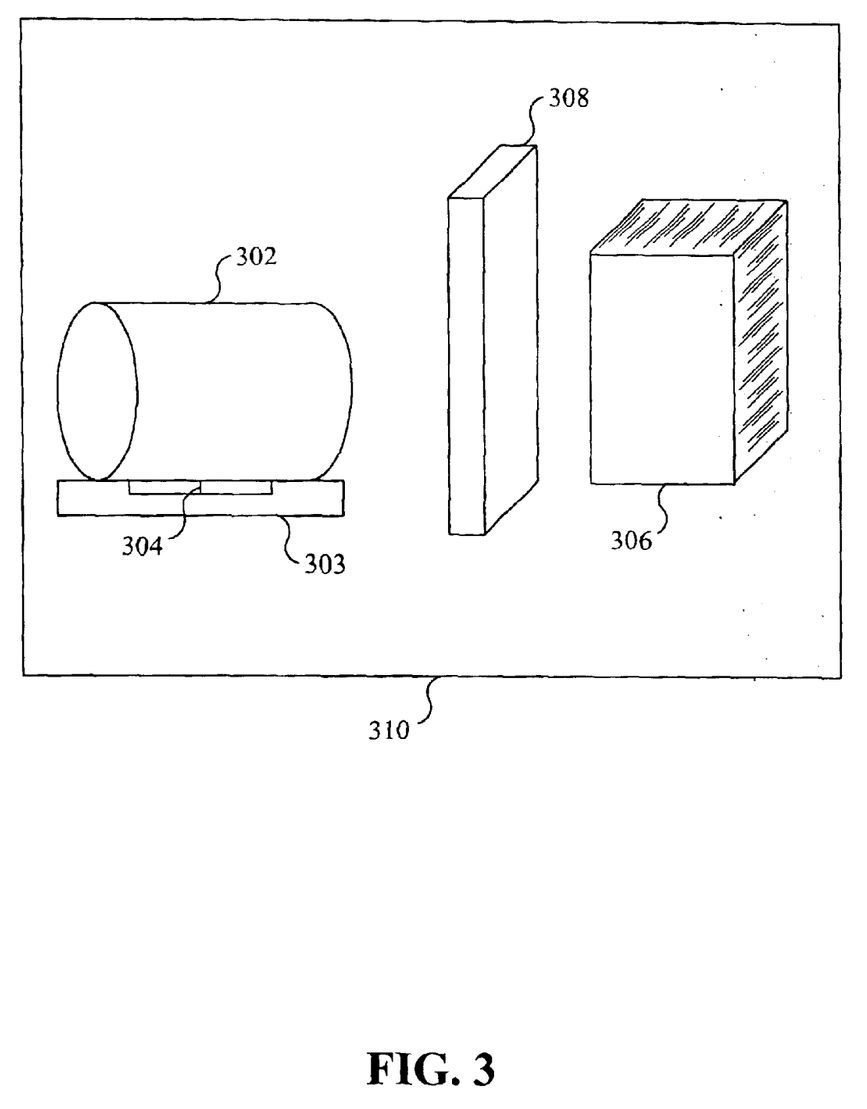
FIG. 3 is a more detailed representation of the imaging engine.

With reference to FIG. 3, the imaging engine 310 includes a lens assembly 302 having a least one lens for focusing light incident on a photo sensor, where the lens assembly 302 is mounted on a lens guidance assembly 303, and having a lens adjustment mechanism 304 for moving at least one lens of the lens assembly 302 along the lens guidance assembly 303 for changing the focal length of the lens assembly 302. Lens adjustment mechanism 304 is operatively connected to the lens assembly 302 for moving one or more optical lenses of the lens assembly 302 along the lens guidance assembly 303. The lens adjustment mechanism 304 may be located within the imaging engine 310 or external to the imaging engine 310.

The imaging engine 310 further includes circuitry for capturing an image 306, including circuitry for photo sensing, analog-to-digital conversion, timing generation, automatic gain control (AGC) and peripheral circuits to control the above components. The circuitry for capturing an image 306 includes an area based image sensor 308, preferably, a charge coupled-device (CCD). In other embodiments, the image sensor 308 may be a CMOS device, a CMD (charge modulated device) or a CID (charge injection device) sensor. As the at least one lens of the lens assembly 302 is moved along the lens guidance assembly 303, the image 306 is focused on the image sensor 308.

In a first embodiment of the optical code reader, distance to a targeted optical code or indicia is determined using a collimated aiming pattern produced by an illumination source. The collimated aiming pattern is reflected from the targeted indicia to the image sensor. Distance to the targeted indicia can then be determined using the angle of reflection of the collimated aiming pattern incident on the target.

Figure 4A:
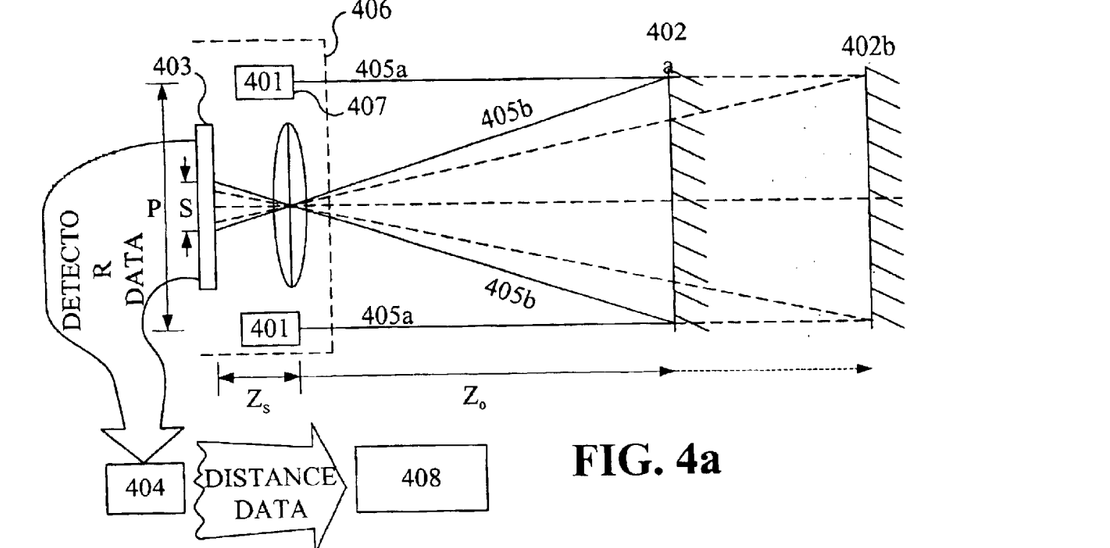
FIGS. 4a and 4b are block representations of an embodiment of the collimated aiming pattern method for determining distance to the indicia in accordance with the present invention.
Figure 4B:
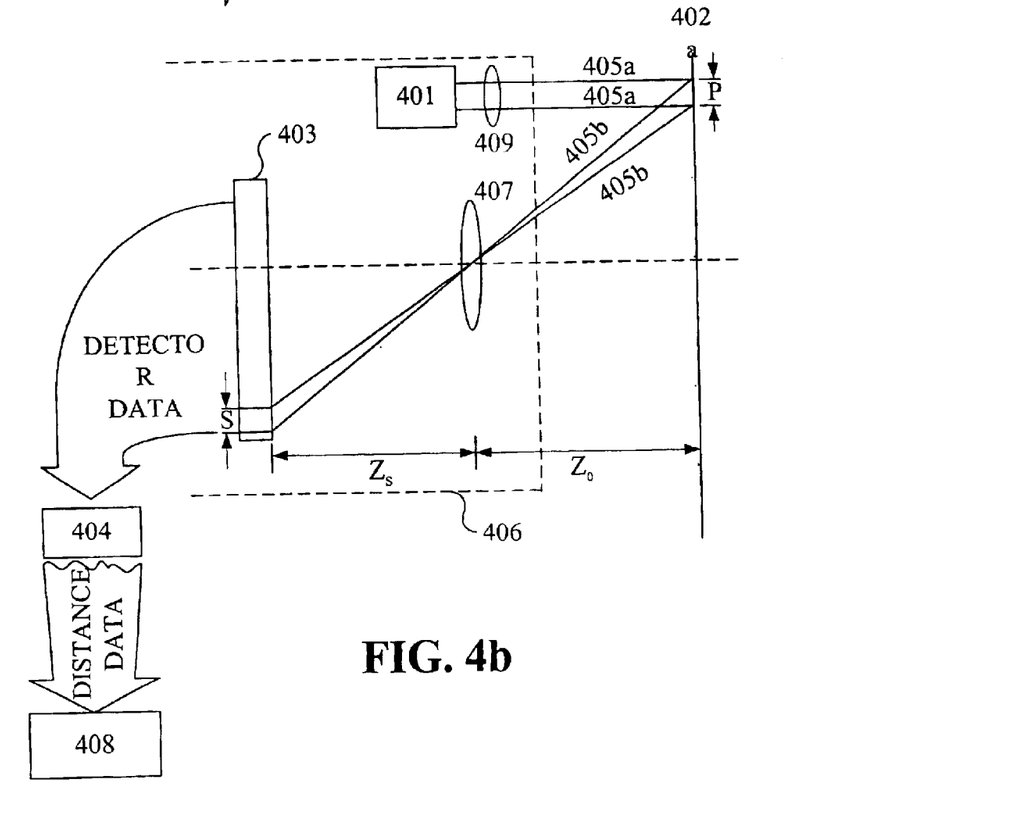

FIGS. 4a and 4b illustrate a representation of the embodiment of this method. FIG. 4a uses two laser beam sources 401 while FIG. 4b depicts a version using a pattern generator 409. In this embodiment, a beam 405a produced by laser diodes 401 of an illuminative assembly is emitted from a housing 406 of a code reader towards a targeted indicia 402a. Subsequently, the incident beam 405a is reflected by the indicia to form a reflected beam 405b. The reflected beam 405b returns to the housing 406, passes through an objective lens 407 and strikes portions of a detector 403, i.e. a photodetector in an array or CCD cell. A processor 404 correlates the size of the activated region of the detector 403 with distance data stored within a lookup table as the exemplary lookup table shown below. The algorithm used to derive the data below is:

$$Z_O = Z_S \frac{P}{S}$$

Where:
  $Z_O$ is the distance from laser 401 to target 402
  $Z_S$ is the distance from Lens 407 to sensor 403
  P is the separation of the two beams (in FIG. 4a) or size of the pattern (in FIG. 4b)
  S is the height of the pattern on the sensor 403

The distance data can then be converted to a form useable for controlling by the processor 404 the associated automatic focusing optics assembly 408 for focusing the image on the detector 403, as described above with respect to the lens adjustment mechanism 304 shown by FIG. 3.

| Lookup Table | |
|---|---|
| Size (S) | Distance ($Z_O$) |
| 1 | 12 |
| 2 | 6 |
| 3 | 4 |
| 4 | 3 |
| . | . |
| . | . |
| . | . |

A second embodiment utilizes the speckle patterns produced by the speckle effect to determine distance. The speckle effect is an observed phenomenon of laser light illuminating a rough surface causing interference within the scattered light. The speckle effect, as its name implies, produces a speckle pattern having bright and dark regions as a result of the interference. As the image sensor is moved away from the surface the speckles grow in size and merge with one another.

Figure 5:
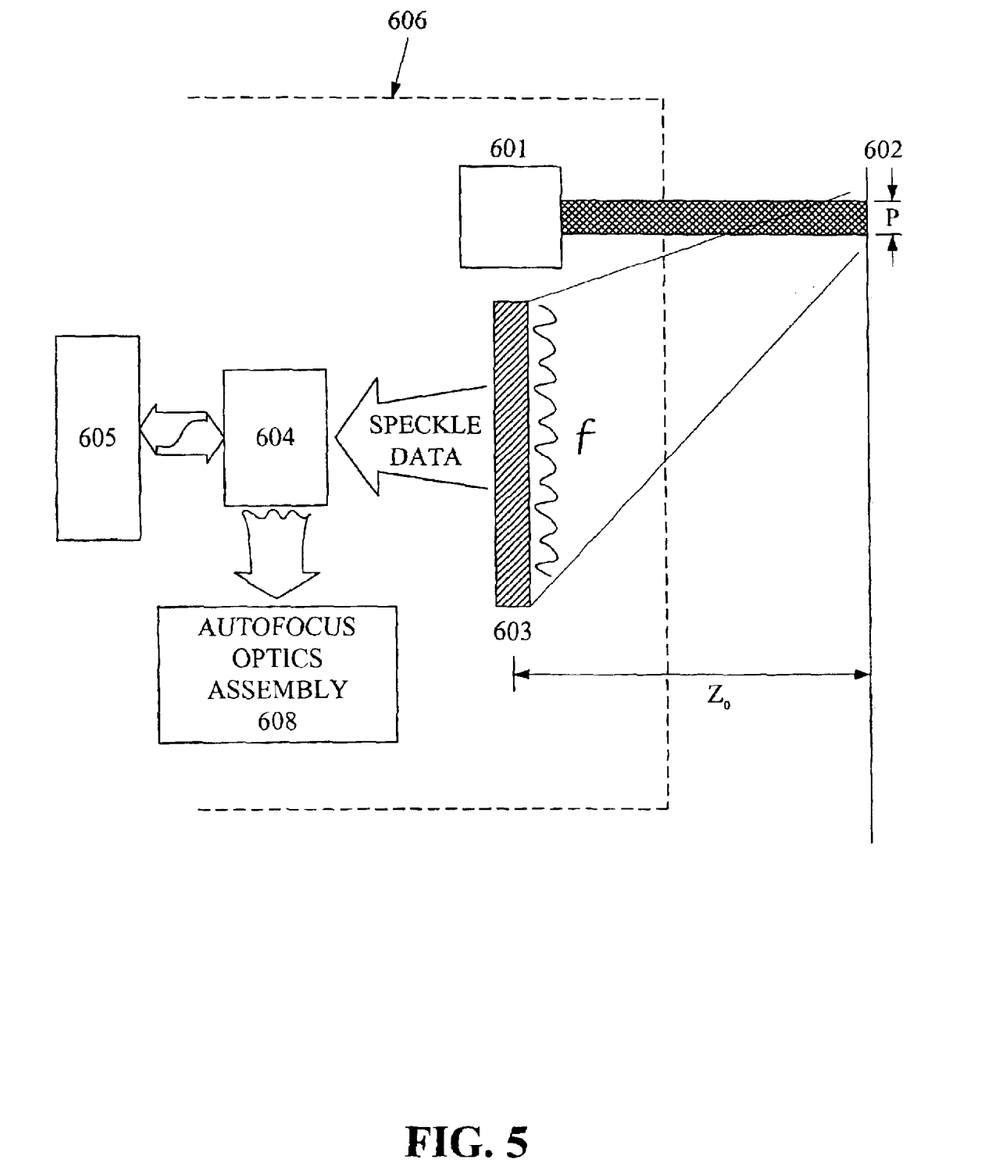
FIG. 5 is a block representation of an embodiment of determining the distance to the targeted indicia using a speckle pattern caused by the speckle effect.

The resulting change in spatial distribution frequency of the speckles in relation to the distance is used to determine the distance to the targeted indicia as illustrated in FIG. 5. An image sensor 603 detects the speckle pattern produced by a laser 601 illuminating the indicia 602. The speckle pattern data is relayed to an image processor 604 for analysis of the spatial distribution frequency. Once the spatial distribution frequency is determined, a corresponding distance value can be retrieved from a lookup table containing predetermined paired frequency-distance data, as the exemplary lookup table shown below, stored in a memory 605 of the code reader. The distance data is derived from the equation:

$$Z_o = \frac{P}{f\lambda}$$

Where:

$Z_O$ is the distance from laser 601 to target 602

$f$ is the spatial frequency on the sensor 603

P is the beam diameter $\lambda$ is the wavelength

The corresponding distance value is then used by the processor 604 to control an automatic focus optics assembly 608 to control movement of at least one lens of the lens assembly to focus an image impinged on the image sensor 603, as described above with respect to the lens adjustment mechanism 304 shown by FIG. 3.

| Lookup Table | |
|---|---|
| Spatial Freq. (f) | Distance ($Z_O$) |
| 100 | 25.64 |
| 200 | 12.82 |
| 300 | 8.55 |
| 400 | 6.41 |
| . | . |

| Lookup Table | |
|---|---|
| Spatial Freq. (f) | Distance ($Z_O$) |
| . | . |
| . | . |

The above described optical code reader utilizes light patterns, such as collimated and speckle patterns, and lookup tables, or other data structures, to determine distance to a targeted indicia and control an automatic focusing assembly, such as the automatic focusing assembly described in co-pending application assigned U.S. application Ser. No. 10/425,344 (1400-13), the contents of which are incorporated herein by reference. The distance determining components correlate the detected patterns reflected by the targeted indicia with distance values stored in the lookup tables.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical code reader including an image sensor, said optical code reader comprising:
    a radiation assembly for emitting a radiation signal towards a target;
    an assembly for detecting an emitted radiation signal reflected by a target; and
    a processor for analyzing characteristics associated with a pattern produced by the reflection of the emitted radiation for determining a distance to the target, wherein said pattern is selected one of a collimated pattern and a speckle pattern.

2. The optical code reader as in claim 1, further comprising an automatic focus optics assembly controlled by the processor for focusing an image of the target in accordance with the determined distance.

3. The optical code reader as in claim 1, wherein the processor comprises means for determining a separation between regions on the image sensor of the optical code reader illuminated by the collimated pattern reflected by the target.

4. The optical code reader as in claim 3, wherein the processor comprises means for correlating the determined separation with a distance to the target.

5. The optical code reader as in claim 4, wherein the means for correlating includes a data structure correlating each of a plurality of separation between regions on the image sensor and the collimated pattern with a respective distance to the target.

6. The optical code reader as in claim 1, wherein the processor comprises means for analyzing the speckle pattern created by the reflection of the radiation signal by the target.

7. The optical code reader as in claim 1, wherein the processor comprises:
    means for determining speckle spatial distribution frequency from the analyzed speckle pattern; and
    means for correlating the determined speckle spatial distribution frequency with a distance to the target.

8. The optical code reader as in claim 7, wherein the means for correlating includes a data structure correlating each of a plurality of speckle spatial distribution frequencies with a respective distance to the target.

9. The optical code reader as in claim 1, further comprising at least one photodetector positioned substantially along a reference plane of an imaging array of the image sensor for detecting the speckle pattern.

10. An assembly for an optical code reader for determining distance to a target, said assembly comprising:
   a radiation assembly for emitting at least one collimated beam of light to illuminate the target;
   an assembly for detecting a collimated pattern created by the reflection of the collimated beam of light by the target; and
   a processor for analyzing the detected collimated pattern to determine the distance to the target.

11. The assembly as in claim 10, further comprising an automatic focus optics assembly controlled by the processor for focusing an image of the target in accordance with the determined distance.

12. The assembly as in claim 10, wherein the processor comprises means for measuring a separation between regions on the image sensor of the optical code reader illuminated by the collimated pattern reflected by the target.

13. The assembly as in claim 12, wherein the processor comprises means for correlating the determined separation with the distance to the target.

14. The assembly as in claim 12, wherein the means for correlating includes a data structure correlating each of a plurality of separation between regions on the image sensor and the collimated pattern with a respective distance to the target.

15. An assembly for an optical code reader for determining distance to a target, said assembly comprising:
   a radiation assembly for emitting a light to illuminate the target;
   an assembly for detecting a speckle pattern created from light being reflected from the target; and
   a processor for processing the detected speckle pattern to determine the distance to the target.

16. The assembly as in claim 15, further comprising an automatic focus optics assembly controlled by the processor for focusing an image of the target in accordance with the determined distance.

17. The assembly as in claim 15, wherein the processor comprises:
   means for analyzing the detected speckle pattern to determine the speckle spatial distribution frequency; and
   means for correlating the speckle spatial distribution frequency to a distance to the target, wherein the means for correlating includes a data structure correlating each of a plurality of speckle spatial distribution frequencies to a respective distance to the target.

18. A distance determining method during electro-optical imaging and reading of indicia, comprising the steps of:
   emitting a collimated beam of light to illuminate the indicia;
   detecting a collimated pattern created by the reflection of the collimated beam of light by the indicia; and
   analyzing the detected collimated pattern to determine the distance to the indicia.

19. The method as in claim 18, where the step of determining distance comprises measuring the angle formed between an optical axis of the optical code reader and the collimated pattern.

20. The method as in claim 18, wherein the indicia is selected from the group consisting of an optical code, alphanumeric characters, a picture, and hand-written notation.

21. A distance determining method during electro-optical imaging and reading of indicia, comprising the steps of:
   illuminating the indicia with an incident light beam;
   detecting a speckle pattern produced by the reflection of the incident light beam by the indicia; and
   analyzing the detected speckle pattern to determine the distance to the indicia.

22. The method as in claim 21, wherein the step of analyzing comprises the steps of:
   calculating speckle spatial distribution frequency based on the detected speckle pattern; and
   correlating the calculated speckle spatial distribution frequency to the distance to the target.

23. An optical system for an optical code reader including an image sensor, said optical system comprising:
   means for automatically focusing an image of an optical code onto the image sensor;
   means for determining distance to the optical code by analyzing a pattern produced by the reflection of a radiation signal by the optical code, wherein said pattern is selected from the group consisting of a collimated pattern and a speckle pattern; and
   means for providing at least one control signal to the automatically focusing means to control the focusing means in accordance with the determined distance.

* * * * *